(12) United States Patent
Fest et al.

(10) Patent No.: US 7,684,768 B1
(45) Date of Patent: Mar. 23, 2010

(54) LOOP POWERED CURRENT-LOOP WIRELESS TRANSMITTER

(76) Inventors: Otto P. Fest, 4016 E. Tennessee St., Tucson, AZ (US) 85714; Noel Smith, 9206 E. Palm Tree Dr., Tucson, AZ (US) 85710

( * ) Notice: Subject to any disclaimer, the term of this patent is extended or adjusted under 35 U.S.C. 154(b) by 499 days.

(21) Appl. No.: 11/820,791

(22) Filed: Jun. 19, 2007

Related U.S. Application Data

(60) Provisional application No. 60/815,181, filed on Jun. 21, 2006.

(51) Int. Cl.
*H04B 1/02* (2006.01)
(52) U.S. Cl. .................. 455/91; 455/100; 455/129; 455/127.5; 340/815.45; 340/815.89; 340/513; 340/664; 340/654; 340/310.11; 340/310.16; 340/573.4; 340/870.02; 340/870.16; 307/125; 307/130; 307/131; 327/365; 327/479

(58) Field of Classification Search .................. 455/91, 455/100, 125, 127.5; 340/815.45, 815.89, 340/664, 654, 513, 310.11, 310.16, 573.4, 340/870.02, 870.16; 307/125, 130, 131; 327/365, 479
See application file for complete search history.

(56) References Cited

U.S. PATENT DOCUMENTS

| 4,190,822 | A | * | 2/1980 | Swarbrick | 340/870.39 |
| 4,908,569 | A | | 3/1990 | Fest | |
| 5,684,451 | A | * | 11/1997 | Seberger et al. | 340/310.16 |
| 6,253,068 | B1 | * | 6/2001 | Elder et al. | 455/121 |
| 6,285,094 | B1 | * | 9/2001 | Fest, Sr. | 307/125 |
| 6,658,239 | B1 | * | 12/2003 | Elder et al. | 455/121 |

* cited by examiner

*Primary Examiner*—Edward Urban
*Assistant Examiner*—Junpeng Chen
(74) *Attorney, Agent, or Firm*—Mark Ogram

(57) ABSTRACT

A self-powered current loop transmitter transmits a process variable over a wireless link, deriving operating power from the current which drives the loop. A storage capacitor is connected across the system input terminals through a switch to provide the operating power for the system components.

20 Claims, 1 Drawing Sheet

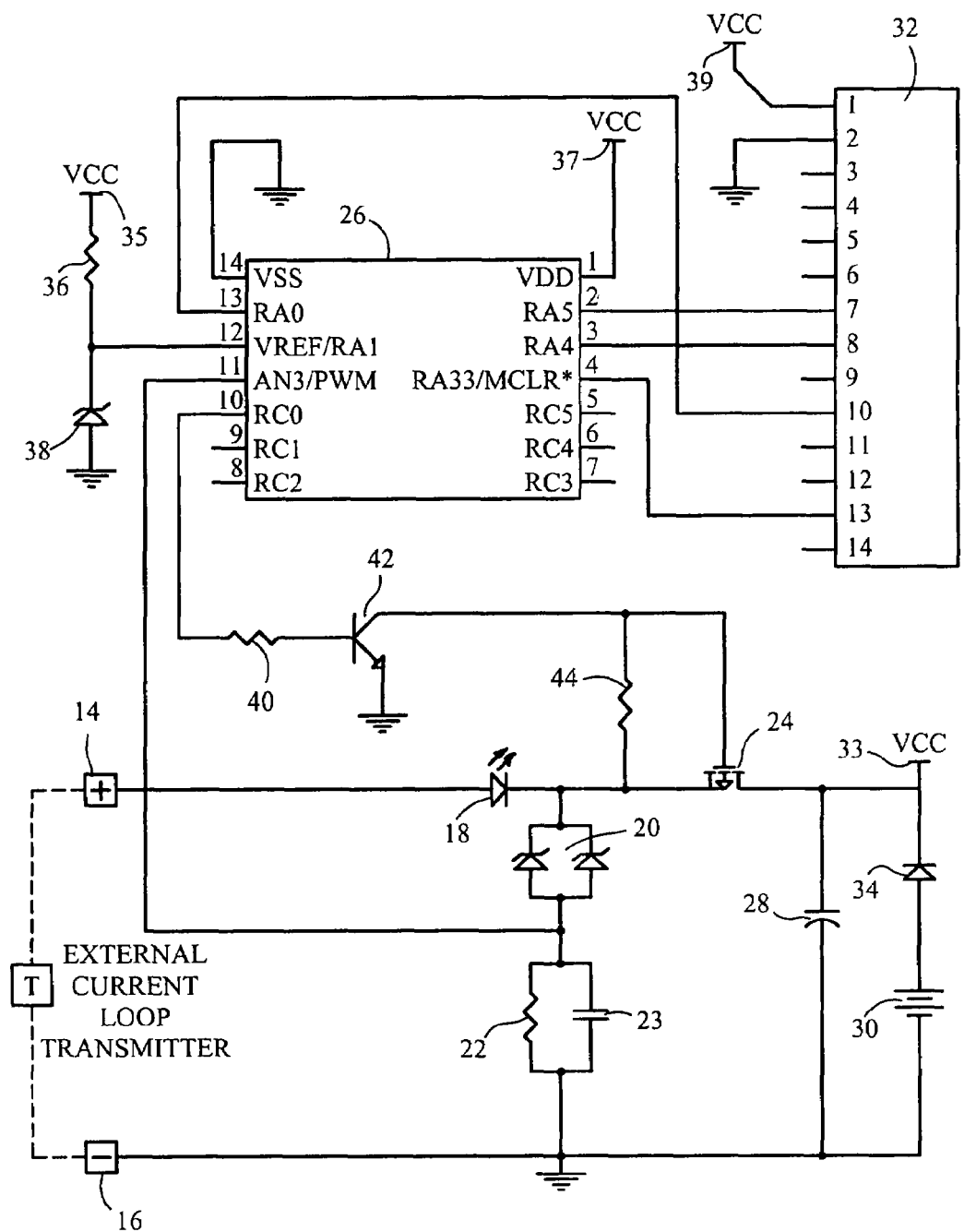

LOOP POWERED CURRENT-LOOP WIRELESS TRANSMITTER

RELATED APPLICATION/PRIORITY DOCUMENT

This patent application corresponds to, and claims the benefit of priority under Title 35 U.S.C. §119(e) of co-pending U.S. provisional application Ser. No. 60/815,181 filed Jun. 21, 2006, incorporated herein by reference.

BACKGROUND

The present invention relates to electric control circuits and more particularly, to control circuits which transmit a process variable over a radio link. The use of current loops enables the most popular, safe and easy method of transmitting a process variable to a distance limited only by the electromotive force (EMF) which drives the loop. A current loop uses a simple two-wire connection, which allows for fast and simple connection to as many devices, in the loop (in series) as desired, limited only by the EMF of the loop.

Traditional process wireless transmitters are externally powered through the AC mains, or from external direct current voltage sources. Consequently, the use of such traditional transmitters is limited by the power source availability in the vicinity of the transmitter.

It is desirable to provide a process wireless transmitter with the capability of transmitting a process variable over a radio link without requiring an additional external power supply.

BRIEF DESCRIPTION OF THE DRAWING

The sole drawing FIGURE is a schematic diagram of an embodiment according to the present invention.

DETAILED DESCRIPTION

Reference now should be made to the drawing, which shows a system in the form of a current-loop transmitter driven by the EMF in the loop. The system which is shown enables the transmission of a process variable over a radio link without the need of external power or wiring. The current industry standard for current-loop is 4-20 mA DC. The circuit which is shown in the drawing is designed to reliably transmit a process variable, such as voltage, current or the like, within the current operating range of 4-20 mA, or a previous standard of 10-50 mA, or any low level source, such as a signal generated by a dynamo. The example given, however, is not intended to limit the invention to these particular ranges, which have been selected because of their present common usage.

The circuit of the drawing forms a loop-powered radio transmitter. The positive loop current +L from an external current loop transmitter (shown as coupled with dotted lines in the drawing) is applied to a first terminal 14. A light emitting diode (LED) 18 functions as a unidirectional device to prevent reverse voltage from damaging circuitry of the system, and to additionally provide a visual display indicative of current flow in the loop. The output of the diode 18 is supplied to a voltage regulator in the form of first and second parallel-connected Zener diodes 20, which protect the circuit from over-voltages which otherwise might result from inadvertent connections. The Zener diodes 20 also clamp the current of the loop to a voltage for safe operation of the circuitry; and these Zener diodes 20 are connected in series with a monitoring resistor 22 to the −L input terminal 16 which is grounded. A filtering capacitor 23 is connected in parallel with the monitoring resistor 22 to filter any noise present in the input signal. The junction between the parallel connected Zener diodes 20 and the resistor 22 comprises a voltage signal representative of the process variable to be transmitted by the system.

Current flow through the diode 18 also passes through an MOSFET transistor 24 operated as an on/off switch which, when it is conductive, allows current from the terminal 14 to be supplied to a storage capacitor 28 (in the form of a super capacitor). The capacitor 28 stores a charge VCC used for operation of the system and the various components in it. A reverse connected diode 34 and a battery 30 are connected in parallel across the capacitor 28, with the battery 30 functioning as a backup battery. The battery 30 only is allowed to discharge current when the 4-20 mA loop either is not present, or is at too low a current to allow for proper operation of the circuit. The backup battery 30 is not necessary for the correct operation of the circuit; but the battery 30 does provide reserve power for the transmitter in case a failure of current in the loop should occur.

The voltage VCC at the terminal 33 obtained from the charge on the super capacitor 28, or alternatively, from the backup battery 30, is applied to terminals 35,37 and 39. The voltage applied to the terminal 35 is connected in series circuit through a reference resistor and a Zener diode 38 to ground (input terminal 16). The junction between the resistor 36 and the Zener diode 38 is connected to the micro-controller 26 (i.e. microchip P/N PIC 12F 683) and forms a reference voltage for an internal analog-to-digital (A/D) convertor in the micro-controller 26 for deriving an analog-to-digital reading of the input process signal supplied to the micro-controller 26 from the junction between the Zener diode pair 20 and the resistor 22.

A transmitter 32 (i.e. Otek Corporation P/N MBTR-O) is used to transmit converted process data obtained from the process output of the micro-controller 26 under the control of the micro-controller 26. The transmitter 32 also has the capability of transmitting converted process data to, and to receive commands from, a distant RF receiver.

When electric current is first applied across the input terminals 14 and 16, the LED diode 18 conducts in the forward direction, and turns on. The MOSFET transistor switch 24 initially is in a conductive state; so that current flows through both the pair of Zener diodes 20 and the resistor 22, and also charges the storage capacitor or super capacitor 28. When the capacitor 28 has a sufficient charge to allow for an RF transmission from the transmitter 32, the MOSFET switch 24 is placed in a non-conducting state by a signal from the micro-controller 26 applied to the gate of the MOSFET transistor 24 through a resistor 40 and a buffer transistor 42. When this occurs, the charge on the capacitor 28 is a stable or steady charge; and an accurate analog-to-digital reading may be taken when the micro-controller 26, super capacitor 28, transmitter 32 and supporting components are disconnected from the 4-20 mA current loop at the terminals 14 and 16.

Current flow through the monitoring resistor 22 develops a voltage at the junction of the resistor 22 and the Zener diodes 20. The filter capacitor 23 filters any noise present in the input signal. The signal at the junction of the diodes 20 and the resistor 22 is used as the source of the analog-to-digital reading connected to the micro-controller 26. The timing of the reading is established by the voltage at the junction of the resistor 36 and the Zener diode 38 supplied with VCC from the terminal 35, as described previously. When this voltage, the reference voltage, attains the desired operating threshold, the micro-controller 26 turns off the MOSFET transistor 24 in the manner described above, allowing an analog-to-digital reading to be accurately taken by the system. Once the monitored signal is placed in a digital form by the A/D convertor of the micro-controller 26, it may be transmitted over the radio link through the transmitter 32 to any number of receivers.

As is readily apparent from an examination of the drawing, operating voltage VCC for the micro-controller 26 and for the transmitter 32 is obtained from the respective terminals 37 and 39 connected to the terminal 33, to which the storage capacitor 28 is connected.

After the transmitter 32 has completed transmission of the digital reading of a process variable obtained from the junction of the Zener diodes 20 and the resistor 22, the micro-controller 26 then applies a signal through the transistor 42 to the gate of the MOSFET switch 24 to place the MOSFET 24 back into a conductive state. This allows the super capacitor/storage capacitor 28 once again to charge from the current applied to the terminal 14; and the process can be repeated.

The foregoing description of an embodiment of the invention is to be considered as illustrative only and not as limiting. Various changes and modifications will occur to those skilled in the art to achieve substantially the same result, in substantially the same way without departing from the true scope of the invention as defined in the appended claims.

What is claimed is:

1. A self-powered current loop transmitter for transmitting a process variable over a wireless link including in combination: a micro-controller having an analog input, a process output, and a control output; first and second input terminals adapted for connection to an external current source; a unidirectional current flow device, a voltage regulator, and a monitoring resistor, connected in series circuit, in the order named, between the first and second input terminals, with the connection between the unidirectional current flow device and the voltage regulator comprising a first junction and the connection between the voltage regulator and the monitoring resistor comprising a second junction; a switch device and a storage capacitor connected in series circuit, in the order named, between the first junction and the second input terminal, with the connection between the switch device and the storage capacitor comprising a third junction connected to the micro-controller to supply operating power thereto; a reference resistor and a Zener diode connected in series circuit, in the order named, between the third junction and the second input terminal to supply a reference voltage to the micro-controller at a fourth junction between the reference resistor and the Zener diode; a connection between the second junction and the analog input to the micro-controller; a connection from the control output of the micro-controller to the switch device to cause the switch device to open and close the circuit from the unidirectional control device to the storage capacitor; and a transmitter, supplied with operating power from the third junction, coupled with the process output of the micro-controller for transmitting converted process data from the micro-controller.

2. The combination according to claim 1 wherein the transmitter is a radio frequency (RF) transmitter.

3. The combination according to claim 2 wherein the unidirectional current device is a diode.

4. The combination according to claim 3 wherein the switch device is an MOSFET transistor having a gate coupled with the control output of the micro-controller.

5. The combination according to claim 4 wherein the micro-controller includes an analog-to-digital convertor, the output of which is the process output.

6. The combination according to claim 5 further including a blocking diode and a backup battery connected in series circuit across the storage capacitor.

7. The combination according to claim 6 wherein the voltage regulator comprises at least one Zener diode.

8. The combination according to claim 7 further including a filter capacitor connected in parallel across the monitoring resistor.

9. The combination according to claim 8 where the unidirectional current control device is a light emitting diode.

10. The combination according to claim 1 wherein the unidirectional current device is a diode.

11. The combination according to claim 10 where the unidirectional current control device is a light emitting diode.

12. The combination according to claim 1 wherein the voltage regulator comprises at least one Zener diode.

13. The combination according to claim 1 wherein the switch device is an MOSFET transistor having a gate coupled with the control output of the micro-controller.

14. The combination according to claim 1 further including a blocking diode and a backup battery connected in series circuit across the storage capacitor.

15. The combination according to claim 1 further including a filter capacitor connected in parallel across the monitoring resistor.

16. The combination according to claim 1 wherein the micro-controller includes an analog-to-digital convertor, the output of which is the process output.

17. The combination according to claim 16 wherein the transmitter is a radio frequency (RF) transmitter.

18. The combination according to claim 17 wherein the switch device is an MOSFET transistor having a gate coupled with the control output of the micro-controller.

19. The combination according to claim 18 wherein the voltage regulator comprises at least one Zener diode.

20. The combination according to claim 19 wherein the unidirectional current device is a diode.

* * * * *